United States Patent [19]

Brown et al.

[11] Patent Number: 4,777,544

[45] Date of Patent: Oct. 11, 1988

[54] METHOD AND APPARATUS FOR IN-SITU MEASUREMENT OF HEAD/RECORDING MEDIUM CLEARANCE

[75] Inventors: Byron R. Brown, Palo Alto; Hung L. Hu, Los Altos Hills; Klaas B. Klaassen, San Jose; Joseph J. Lum, San Jose; Jacobus C. L. Van Peppen, San Jose; Walter E. Weresin, San Jose, all of Calif.

[73] Assignee: International Business Machine Corporation, Armonk, N.Y.

[21] Appl. No.: 897,180

[22] Filed: Aug. 15, 1986

[51] Int. Cl.$^4$ .......................... G11B 5/60; G11B 21/02
[52] U.S. Cl. ...................................... 360/75; 360/103; 324/226
[58] Field of Search .................... 360/31, 75, 105, 107, 360/102, 103, 97-99, 109; 318/638, 676; 324/207, 208, 210, 212, 226

[56] References Cited

U.S. PATENT DOCUMENTS

| 3,183,516 | 5/1965 | Sliter | 360/75 |
| 3,456,249 | 7/1969 | Pear | 360/75 |
| 4,146,911 | 3/1979 | Gyi et al. | 360/75 |

FOREIGN PATENT DOCUMENTS 60-103570  6/1985  Japan ................................... 360/103

OTHER PUBLICATIONS

"The Reproduction of Magnetically Recorded Signals", *The Bell System Technical Journal*, vol. 30, Oct. 1951, pp. 1145-1173, by R. L. Wallace, Jr.
*IBM Tech. Discl.* Bull. vol. 11, No. 12, May 1969, p. 1650, entitled "Head Flight Height Monitoring", by A. A. Gaudet et al.
"Use of Readback Signal Modulation to Measure Head/Disk Spacing Variations in Magnetic Disk Files", Technical Report No. 11, The Center for Magnetic Recording Research, University of California, San Diego, Dec. 1985, by W-K Shi et al.
"Effect of Flying Height Variation on Offtrack Data Handling", *IEEE Trans. on Magnetics*, MAG-17-No. 4, Jul., 1981, pp. 1372-1375 by F. Morris et al.

Primary Examiner—Raymond F. Cardillo
Assistant Examiner—Steven R. Garland
Attorney, Agent, or Firm—Otto Schmid, Jr.

[57] ABSTRACT

A method and apparatus for measuring the flying height of a slider supporting a magnetic transducer in-situ in a direct manner in an operational magnetic disk storage system. The method and apparatus produce relative motion between the magnetic transducer and a magnetic recording medium at a first velocity so that the resulting air bearing positions the magnetic transducer slider at a first flying height from the magnetic medium. A single signal of constant periodicity is written over a predetermined area of the recording medium by the magnetic transducer, and a readback signal is sensed from the predetermined area of the recording medium to produce a first signal. The flying height of the magnetic transducer slider is lowered to substantially zero, and a readback signal is sensed at the lowered flying height to produce a second signal. The first flying height is then calculated as the ratio, expressed in decibels, of the first and second signals times the wavelength divided by a constant. In an alternate embodiment a plurality of signals are recorded and readback signals are simultaneously sensed at two separate wavelengths. In a further embodiment, a signal is recorded which has a spectral content comprising a plurality of different frequencies, and readback signals are simultaneously sensed at two separate wavelengths.

34 Claims, 4 Drawing Sheets

METHOD AND APPARATUS FOR IN-SITU MEASUREMENT OF HEAD/RECORDING MEDIUM CLEARANCE

BACKGROUND OF THE INVENTION

1. Field of the Invention

This invention relates to moving storage apparatus of the type in which the read/write transducer is in contact with the storage medium when at rest and "flies" above the medium surface when the medium is moving at operating speed, and more particularly to a method and apparatus for measuring the flying height of the transducer over the storage medium.

2. Description of the Prior Art

In high speed data processing systems, magnetic disks have been employed for large storage capacity requirements. Data is read from and written onto the disks by magnetic transducers commonly called magnetic heads which are positioned over the disk during the retrieval and storage of data on tracks of the disks. The requirements for higher data density on magnetic disks have imposed a requirement to read and write more data on narrower tracks located on the disk. The achievement of a higher data density requires increasingly narrow transducing gaps and increasingly less spacing or clearance commonly called flying height, between the magnetic transducer and the disk recording surface. It becomes increasingly more difficult to maintain this low flying height constant to the degree required to reliably record and read data at the higher data density.

Prior art methods for measuring flying height have included various capacitive and optical techniques which require special "test" disks or sliders. These methods are unable to measure the slider/disk clearance in-situ or in a direct manner. The clearance between real sliders and disks is inferred from the measurements from the "test" sliders or disks. This method has been suitable up to the present, but, with the low flying heights now required, the accuracy and precision of the prior art indirect measurements are no longer satisfactory.

The effect of head/media spacing on the amplitude of magnetic read back signals is described by R. L. Wallace, Jr. in "The Reproduction of Magnetically Recorded Signals", The Bell System Technical Journal, Vol. 30, Oct. 1951, pp. 1145–1173. This publication includes the Wallace equation which expresses the dependence of the readback voltage on various recording parameters including the head/disk spacing.

Using the modulation of the read signal envelope to measure variations in head/disk spacing is described in "Head Flight Height Monitoring" by Boudet et al in the IBM Technical Disclosure Bulletin, Vol. 11, No. 12, May, 1969, p. 1650. The control factor described there is based on a comparison of the currently detected read signal level with the average of previously detected levels.

The modulation of the read signal envelope to measure variations in head/disk spacing is also described in Shi et al, "Use of Readback Signal Modulation to Measure Head/Disk Spacing Variations in Magnetic Disk Files", Technical Report No. 11, The Center for Magnetic Recording Research, University of Calif., San Diego, Dec., 1985. The readback signal modulation technique is used in conjunction with a laser-doppler vibrometer to measure simultaneously the spacing variation and disk vibrations that result from various laboratory induced impacts directly on the disk of an operating disk file. While this apparatus is useful as a laboratory tool in the research and development of magnetic disk files, the disk file structure must be altered to accommodate the laser-doppler vibrometer and the equipment required is very costly.

"Effect of Flying Height Variation on Offtrack Data Handling" by Morris et al, IEEE Trans. on Magnetics MAG-17 No. 4, Jul., 1981, pp. 1372–1375 infers flying height variations by modulation of the magnetic head read signal and correlates the flying height variation to offtrack data handling capability.

The prior art has not shown a method and apparatus for measuring the spacing between a magnetic transducer and the recording medium in-situ in a direct manner in an operational magnetic disk storage system.

SUMMARY OF THE INVENTION

It is therefore the principal object of this invention to provide a method and apparatus for measuring the spacing between a magnetic transducer and the recording medium in-situ in a direct manner in an operational magnetic disk storage system.

In accordance with the invention, a method and apparatus for measuring the flying height of a slider supporting a magnetic transducer in a moving magnetic storage system comprising producing relative motion between the magnetic transducer and a magnetic recording medium at a first velocity v so that the resulting air bearing positions the magnetic transducer slider at a first flying height from the magnetic medium. A single signal of constant periodicity T is written over a predetermined area of the recording medium by the magnetic transducer, and a readback signal is sensed from the predetermined area of the recording medium to produce a first signal. The flying height of the magnetic transducer slider is lowered to substantially zero, and a readback signal is sensed at the lowered flying height to produce a second signal. The first flying height is then calculated as the ratio, expressed in decibels, of the first and second signals times the wavelength W divided by a constant.

An alternate embodiment includes writing a plurality of signals of constant periodicity $T_1, T_2, —T_n$ over the predetermined area of the recording medium, sensing a readback signal at a first wavelength to produce a first signal, and simultaneously sensing a readback signal at a second wavelength to produce a second signal. The flying height is lowered to substantially zero, and readback signals are sensed at the two wavelengths to produce third and fourth signals. The first flying height is then calculated as a constant times the product of two terms. The first term is the product of the two wavelengths divided by the difference between the two wavelengths, and the second term is the ratio of the first and second signals, expressed in decibels, subtracted from the ratio of the third and fourth signals, expressed in decibels.

A further embodiment of the invention utilizes at least one signal of constant periodicity T written over the predetermined area of the recording medium so that the readback signal has a spectral content comprising a plurality of different frequencies. A readback signal is sensed at a first wavelength $W1=vT$ from the predetermined area of the recording member to produce a first signal and simultaneously a readback signal is sensed at a second wavelength $W_n=nvT$ ($n \neq 1$, n is positive number) from the predetermined area of the recording member to produce a second signal. The flying height of the magnetic transducer slider is then reduced to substantially zero, and readback signals are sensed at the lowered flying height at the two wavelengths to produce third and fourth signals. The first flying height is then calculated as the product of two terms; the first term being a constant times the velocity v divided by the difference in frequency between the first and second signals, the second term being the difference of the ratio, expressed in decibels, of the first and second readback signals at the two wavelengths and the ratio, expressed in decibels, of the third and fourth readback signals at the two wavelengths.

The foregoing and other objects, features and advantages of the invention will be apparent from the following more particular description of a preferred embodiment of the invention as illustrated in the accompanying drawings.

DESCRIPTION OF THE PREFERRED EMBODIMENTS

The present invention will be described as applied to a magnetic disk storage apparatus, but it will be clear to those skilled in the art that the invention is not so limited but is applicable to other mechanically moving magnetic storage apparatus as well.

Figure 1:
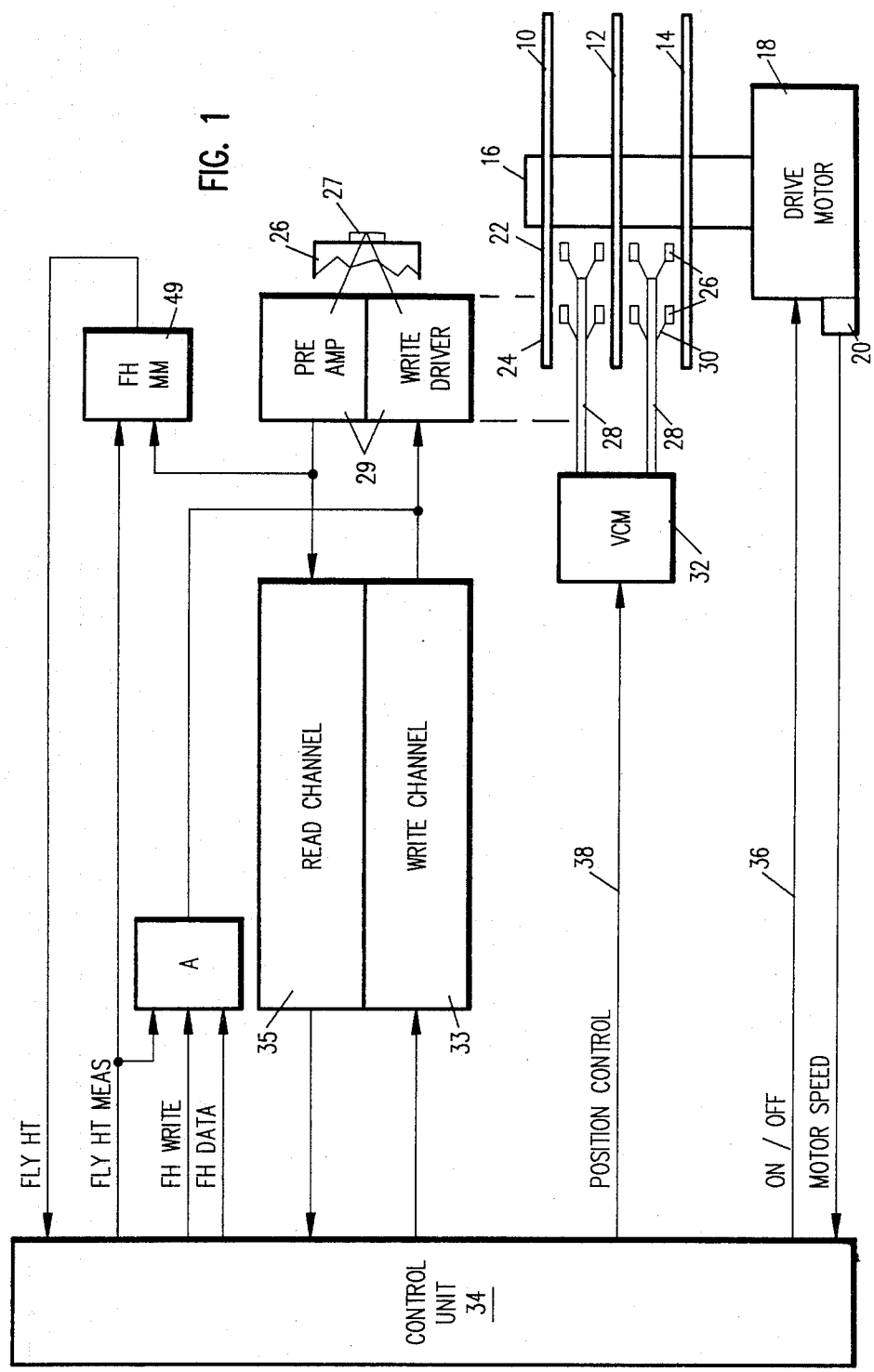
FIG. 1 is a simplified block diagram of a disk file embodying the present invention.

In a conventional magnetic disk file as shown in FIG. 1, a plurality of rigid rotatable disks, such as disks 10, 12 and 14, are supported on a spindle 16 and rotated by a disk drive motor 18, whose rotational speed is sensed by sensor 20. The magnetic recording media on each disk is in the form of an annular pattern of concentric data tracks having an inside diameter 22 and an outside diameter 24, as shown on disk 10.

As the disks rotate, the sliders are moved radially in and out so that the heads may access different portions of the disk surfaces containing the data. Each slider 26 supports one or more read/write heads and is attached to an actuator arm 28 by means of a suspension 30. The suspensions 30 provide a slight spring force which biases the sliders against the disk surfaces. Each actuator arm 28 is attached to a voice coil motor (VCM) 32. The VCM is a coil movable within a fixed magnetic field, and the direction and velocity of the coil movement is controlled by the current supplied.

During operation of the disk file, the rotation of the disks generates an air bearing between the sliders and disk surfaces. This air bearing thus counterbalances the slight spring force of the suspensions and supports the slider off the disk surfaces during operation.

The above description of a typical disk file, and the accompanying illustration of it in FIG. 1, are for representative purposes only. It should be apparent that disk files may contain a large number of disks and VCMs and that each VCM may support a number of sliders. The present invention of a method and apparatus for measuring flying height of the heads above the disk surface is fully applicable to any such movable storage apparatus, provided it is of the type in which the sliders are in contact with the storage medium when at rest and "fly" above the storage medium when at operating speed.

The various components of the disk file are controlled in operation by signals generated by control unit 34 which includes internal clock signals, logic control circuits, storage and a microprocessor. The control unit 34 generates control signals to control various disk file operations such as motor control signals on line 36 and position control signals on line 38. The control signals on line 38 provide the desired current profile to optimally move the selected slider 26 to the desired track on the associated disk.

Figure 2:
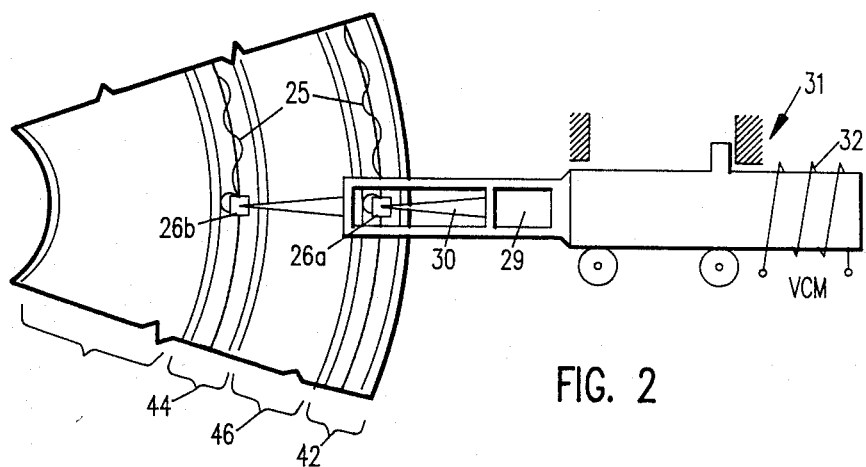
FIG. 2 is a diagram showing the accessing mechanism for a single disk surface of the apparatus of FIG. 1.

As shown in FIG. 2, the sliders 26a and 26b are positioned so that they are initially at one or more tracks 42 and 44 which constitute landing zones on a plurality of data tracks 46 and 48. In accordance with the present invention, a signal is recorded on a predetermined area of the disk which is preferably a part of landing area tracks 42 and 44, but it could as well be in one of the data track areas 46 or 48. The pattern to be recorded is processed through the write channel 33 (FIG. 1) and coupled to a write driver which forms a part of the arm electronics 29. The readback signal from magnetic transducer 27 (FIG. 3) is first amplified in a preamplifier which is a part of the arm electronics 29 and then processed by the read channel 35.

The terms flying height, spacing and clearance are used somewhat interchangeably in the art, although their derivation and meaning are different. The term flying height was first used to refer to the results of an optically measured distance between a magnetic transducer slider and a recording medium, whereas the term spacing relates to a magnetically defined distance between a magnetic transducer and a magnetic recording medium, and these values could differ because of the presence of an overcoat layer on the recording medium, for example. The term clearance is the physical clearance between the magnetic transducer slider and the magnetic recording medium surface, and it is this factor which is referred to as flying height as measured by the method of the present invention.

Figure 3:
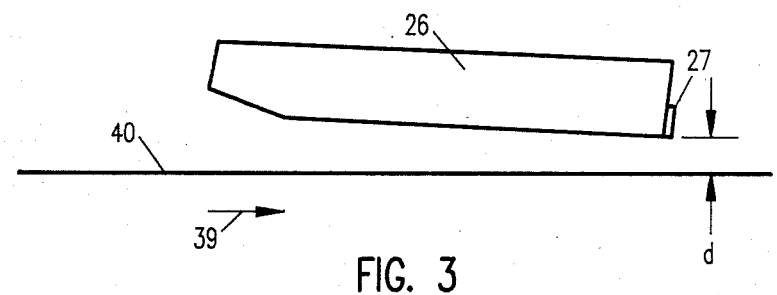
FIG. 3 is a side view showing the position of the slider at normal relative velocity between the slider and the magnetic recording medium.

As shown in FIG. 3, the magnetic transducer slider 26 is supported in a position away from the magnetic recording medium surface 40 by the air bearing formed by the relative motion, depicted by arrow 39, between the slider 26 and the magnetic recording medium. In the embodiment shown, the slider 26 is shaped so that the flying attitude, at normal relative velocity v, positions magnetic read/write transducer 27 a distance d from the record medium surface 40. Transducer 27 is preferably an inductive read/write transducer, although the invention is also equally applicable to separate inductive read and write transducers on the same slider, and also to an inductive write transducer and a magnetoresistive read transducer on the same slider. The read and write transducers need not be on the same slider, but in this case, it is the spacing of the read transducer that is sensed.

Figure 5:
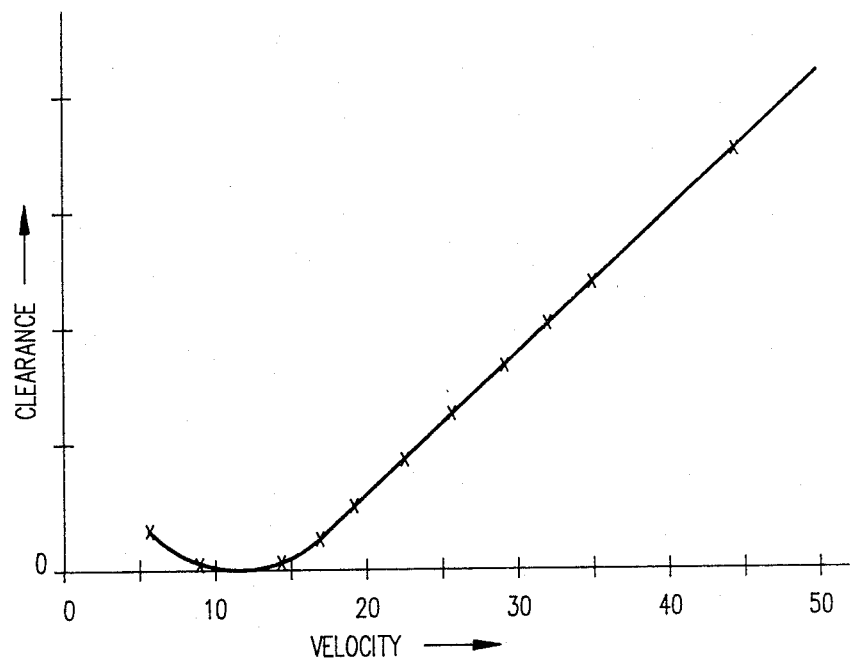
FIG. 5 is a plot of the clearance between the magnetic transducer and the disk surface vs. relative velocity between the magnetic transducer and the disk surface.

According to the present invention, a method and apparatus is provided for measuring flying height of all the magnetic heads in an operational magnetic disk storage system. The use of the method is invoked by the signal FLYHT MEAS which is generated by control unit 34. In accordance with the method, the readback signal is also coupled to a Flying Height Measuring Means 49 under control of the FLYHT MEAS signal from control unit 34. The theoretical basis for the method and apparatus is the Wallace spacing loss equation which expresses the dependence of the readback voltage on various recording parameters including the head/disk spacing. This formula can be stated as $$\Delta \text{ Spacing} = \frac{\lambda}{2\pi} \ln \frac{E}{E_o} \times \text{correction factor} \qquad (1)$$

$$\text{Correction factor} = \frac{v_o}{v} \; \frac{G(v_o/\lambda)}{G(v/\lambda)} \qquad (2)$$

where
- $\lambda$ = wavelength of recorded patterns on disk
- $E_o$ = amplitude of one reading
- $E$ = amplitude of next reading and for the correction factor
- $v_o$ = velocity at time $E_o$ was measured
- $v$ = velocity at time $E$ was measured
- $G$ = frequency response of system The correction factor formula (2) as stated above is applicable to an inductive read transducer. However, should a magnetoresistive read transducer be used, the first $V_o/V$ factor is replaced by unity. The above formula (1) indicates that the variation of the signal measured in decibels can be translated into spacing or flying height change. Knowledge of the spacing or flying height change provides some useful information, but it is the absolute flying height that is desired. The absolute flying height can be measured by decreasing the clearance of the slider over the disks in some manner, to a reference clearance, such as zero clearance, for example, so that a reference reading at the decreased spacing, such as zero clearance, can be obtained. The clearance can be decreased by mechanical force loading, or evacuation of the gases from the air bearing, for example. The preferred way of decreasing the clearance of the slider over the disks, known as a "spin down," is to decrease the velocity of the disks so that the air bearing collapses and the slider contacts the disk. As shown in FIG. 5, as the velocity decreases, the clearance also decreases, and the readback signal is sensed at each of the velocity points. When the corrected signal (i.e., the signal as corrected by formula (2)) ceases to increase, this indicates that the slider is in contact with the disk surface. Even though the slider is in contact with the disk surface, since the velocity is still substantially above zero, sufficient readback signal is produced by transducer 27 to generate an accurate flying height reference signal. The absolute flying height can then be calculated as the summation of all the $\Delta$ flying height values calculated from the zero spacing value to that calculated at the normal operating velocity of the disk file. The absolute flying height can be calculated as the ratio expressed in decibels, of the signal sensed at the first flying height to the signal sensed at zero clearance times wavelength divided by a constant.

To obtain an accurate measurement of flying height, the readback signal amplitude should be measured with the magnetic head aligned with the track upon which the test signal is written. High performance magnetic disk files typically have a tracking servo system which operates only when the disks are rotating at normal velocity. For these systems, it is preferable to write the test signal with the actuator positioned near the end-of-travel crash stop. As shown in FIG. 2, the test signal is preferably written on tracks 42 or 44 while the actuator 28 is near crash stop 31. Then, during the "spin down", a small AC current is applied to VCM 32 so that the resulting motion can vibrate the actuator 28 away from the crash stop 31 to produce a dithering motion 25 (FIG. 2) of the slider across the recorded tracks. This action permits the peak detector 56 to capture the peak readback signal amplitude as the magnetic transducers 27 cross the center of the written track 42 or 44. The "spin down" is initiated by cutting the power to the drive motor 18, and the relative velocity during the spin down can be sensed by reference to the MOTOR SPEED signal provided by sensor 20 or by reference to the frequency of the readback signal.

Figure 4:
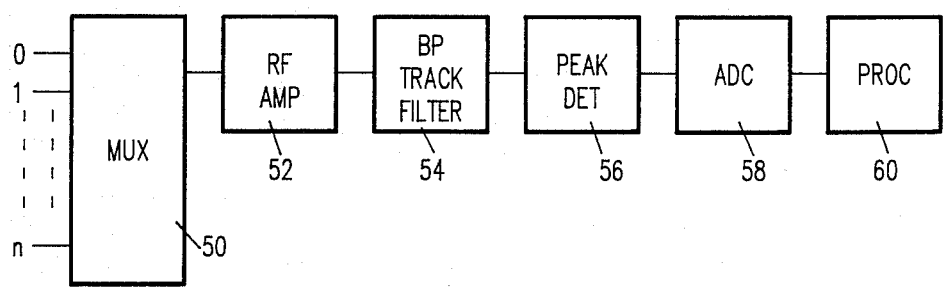
FIG. 4 is a block diagram of the apparatus for carrying out the flying height measurement according to a specific embodiment of the present invention.

A block diagram of the apparatus for a specific embodiment for carrying out the invention is shown in FIG. 4. A multiplexer 50 enables the read signal from a particular one out of all the magnetic heads to be sensed, and RF amplifier 52 provides an amplified signal. The output of amplifier 52 is coupled into a tracking bandpass filter 54, from which the signal is coupled to peak detector 56. Peak detector 56 senses the peak amplitude of the read signal and this value is coupled to analog to digital converter (ADC) 58 to provide a digital representation of the peak amplitude of the read signal. The digital signal is then coupled to processor 60 in which the calculations, according to equations (1) and (2) are executed. In a specific embodiment the multiplexer 50 and RF amplifier 52 already exist in the disk file so all that is required are logic circuits to respond to the FLYHT MEAS signal to gate the read signal to these components. The tracking bandpass filter 54 and the peak detector 56 are apparatus that must be added to practice the method, and these components are combined in the box labeled as the Flying Height Measuring Means 49. The ADC 58 and the processor 60 are already available in the disk file. The microprocessor present in the control unit could be used for processor 60 or alternatively, a dedicated microprocessor such as the well known Model 8088 microprocessor manufactured by Intel Corporation, Santa Clara, Calif., could also be used.

The tracking bandpass filter 54 serves the dual function of a filter and frequency tracking. The tracking bandpass filter 54 comprises a frequency mixer, a variable frequency local oscillator, a bandpass filter, and an intermediate frequency tuned amplifier. The filtering function permits only the amplitude of the fundamental frequency of the readback signal to be detected in accordance with the assumptions for which the Wallace analysis is valid. An additional function of the bandpass filter is to increase the signal-to-noise ratio of the amplitude measurement. The frequency tracking function permits the filter to accommodate the change of readback signal frequency as the disk velocity changes. The tracking function is operated in response to the MOTOR SPEED signal which is derived from sensor 20 or in response to the frequency of the readback signal.

The simplest implementation of the invention utilizes only a recorded signal having only a single wavelength $\lambda$, and this signal is recorded in a specific location on the disk which could be any location such as the initial tracks 42 and 44, or one of the data tracks 46 or 48. The data already recorded on a specific track could also be used. The preferred recorded track comprises a track recorded at the initial tracks 42 or 44, and it is preferred that the track be recorded at the frequency of a clock source already available in the file. A shorter wavelength signal is preferred such as a signal at a frequency of 20 MHz, for example.

A second embodiment of the invention utilizes a dual-wavelength method for measuring changes in the head/disk spacing. This method has intrinsic long term stability and is therefore suitable for incorporating in a disk file to provide a warning for loss of head/disk clearance which may lead to a head crash. The dual-wavelength method requires recording two magnetic wavelengths $\lambda a$ and $\lambda b$ either on adjacent tracks or preferably interleaved on one track or track segment. The zero clearance value is measured as before so that the absolute flying height can be measured. Subsequently, by measuring only the ratio of the readback signal amplitudes at the two wavelengths, any change in flying height occurring between the first measurement and the subsequent measurement can be calculated by $$d_2 - d_1 = \frac{\lambda a \lambda b}{2\pi(\lambda b - \lambda a)} \ln \frac{R_2}{R_1}$$

where $R_1$ and $R_2$ are the ratios of the signal amplitudes measured for the two wavelengths at times 1 and 2. The absolute flying height can be calculated as a constant times the product of two terms, the first of the two terms being the product of the two wavelengths divided by the difference between the two wavelengths, the second of the two terms being the ratio of said first and second signals, (measured at time 1) expressed in decibels, subtracted from the ratio of the third and fourth signals (measured at time 2), expressed in decibels. By the use of this embodiment, signal perturbations such as gain drift and track misregistration, to the extent they are independent of wavelength, do not change the measured signal ratios and, therefore, do not cause error.

Figure 6:
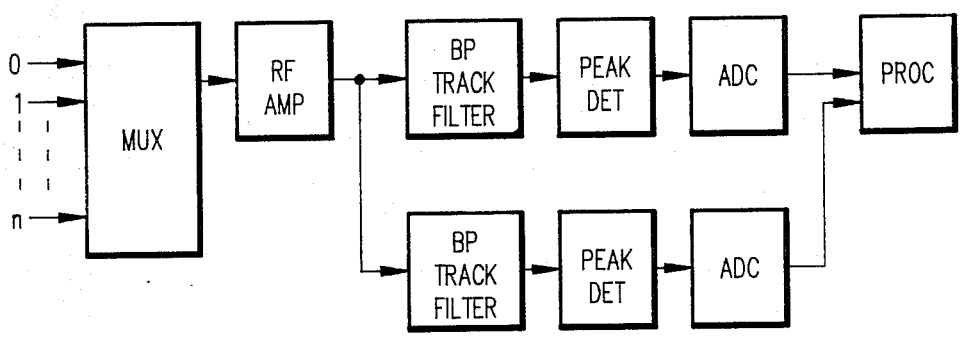
FIG. 6 is a block diagram of the apparatus for carrying out an alternate embodiment of the flying height measurement.

A block diagram of the apparatus for carrying out the dual wavelength embodiment of the invention is shown in FIG. 6. The apparatus comprises a multiplexer 50 and an RF amplifier 52 which function in the same manner as for the single signal embodiment. Two tracking band-pass filters 54a and 54b are provided, one to track each wavelength $\lambda a$ and $\lambda b$. Peak detectors 56a and 56b sense the peak amplitude of the signals, and this amplitude is converted to digital form in ADCs 58a and 58b. The converted values of the two signals are coupled to processor 60 for calculation of the flying height in accordance with the formula stated above.

A further embodiment of the invention is known as the Harmonic Ratio Flyheight (HRF) method, and this method is based on writing a signal whose readback has a spectrum which is constant along the track and which has non-zero amplitude for at least two different frequencies. Such a pattern may be obtained by writing several passes over the same track, each time writing a different wavelength, which may or may not be harmonically related with a reduced write current to influence the relative magnitude of the written spectral lines. The preferred write signal is one single pass writing of a periodic signal (single wavelength W, constant transition density) at the write current normally used for writing data.

The write signal can be chosen to conform to the encoding and writing capabilities of the file and may consist, for example, of a concatenation of valid code words recorded in a single repetitive waveform along the entire track or track segment to produce a square wave write current. The analog readback signal V(t) is then a periodic signal with a fundamental frequency $f_1$, $=v/w$ recorded at a linear velocity v. The spectrum of the readback signal V(t) predominantly consists of odd harmonic lines at frequencies $f_n = n \times f_1$, (n = 1,3, 5). From this spectrum, the instantaneous amplitude $V(f_1)$ of the fundamental frequency $f_1$ and the instantaneous amplitude $V(f_n)$ of an odd higher harmonic at frequency $f_n$ are simultaneously measured. The HRF measurement method now produces an instantaneous output signal $V_{out}(t)$ equal to the logarithm of the ratio of the two detected amplitudes $V(f_1)$ and $V(f_n)$ of the two spectral lines $f_1$ and $f_n$ in the readback signal V(t).

$$V_{out}(t) = K \ln \frac{V(f_1)}{V(f_n)}$$

K is the gain factor

This can be shown, using Wallaces equations to be equal to:

$$V_{out}(t) = K\left(C + 2\pi d \frac{\Delta f}{v}\right)$$

Here C is a constant independent of the clearance d and $\Delta f = f_n - f_1$ at the time of writing the signal and v is the linear velocity at the time of writing.

The above-described measurement will not yield the absolute value of the clearance d, since the measurement includes a constant whose value is not known. However, if a second, reference measurement is performed at a known value of d (for instance at d=o) the constant can be calculated and subtracted from the measured signal $V_{out}(t)$. The condition d=o can be assumed to exist for low velocities where the slider is in contact with the surface of the medium, and this can be achieved by the use of the "spin down" technique described above.

Without such a reference measurement, the above-described measurement measures changes in the clearance, for example, from $d=d_1$ to $d=d_1+\Delta d$. This results in a change in output voltage:

$$\Delta V_{out} = K\left(C + 2\pi d_1 \frac{\Delta f}{v}\right) - K\left(C + 2\pi(d_1 + \Delta d)\frac{\Delta f}{v}\right)$$
$$= 2\pi \frac{\Delta f}{v} \Delta d$$

where $\Delta d$ is the change in clearance between the two measurements.

The above formulas can be solved for $\Delta d$ for calculating the flying height. In this case the absolute flying height is calculated as the product of two terms; the first term being a constant times the velocity v divided by the difference in frequency between the first and second signals, the second term being the difference of the ratio, expressed in decibels, of the first and second readback signals (at the first flying height) at the two wavelengths and the ratio, expressed in decibels, of the third and fourth readback signals (at the reference flying height) at the two wavelengths.

The HRF measurement method is a continuous, instantaneous measurement of the ratio of two spectral lines $V(f_1)$ and $V(f_n)$ in the spectrum of the readback signal $V(t)$. Both instantaneous spectral line amplitudes relate to the same volume element of the recording medium directly underneath the head. This makes the measurement inherently insensitive to such disturbances as those caused by variations in amplifier gain, head efficiency, effective trackwidth, misregistration, medium velocity, magnetic moment, and medium thickness. In addition, the HRF measurement method permits one not only to determine the instantaneous head clearance $V_{out}(t)$ to correctly determine the track average value of head clearance $V_{out}(t)$ avg.

Figure 7:
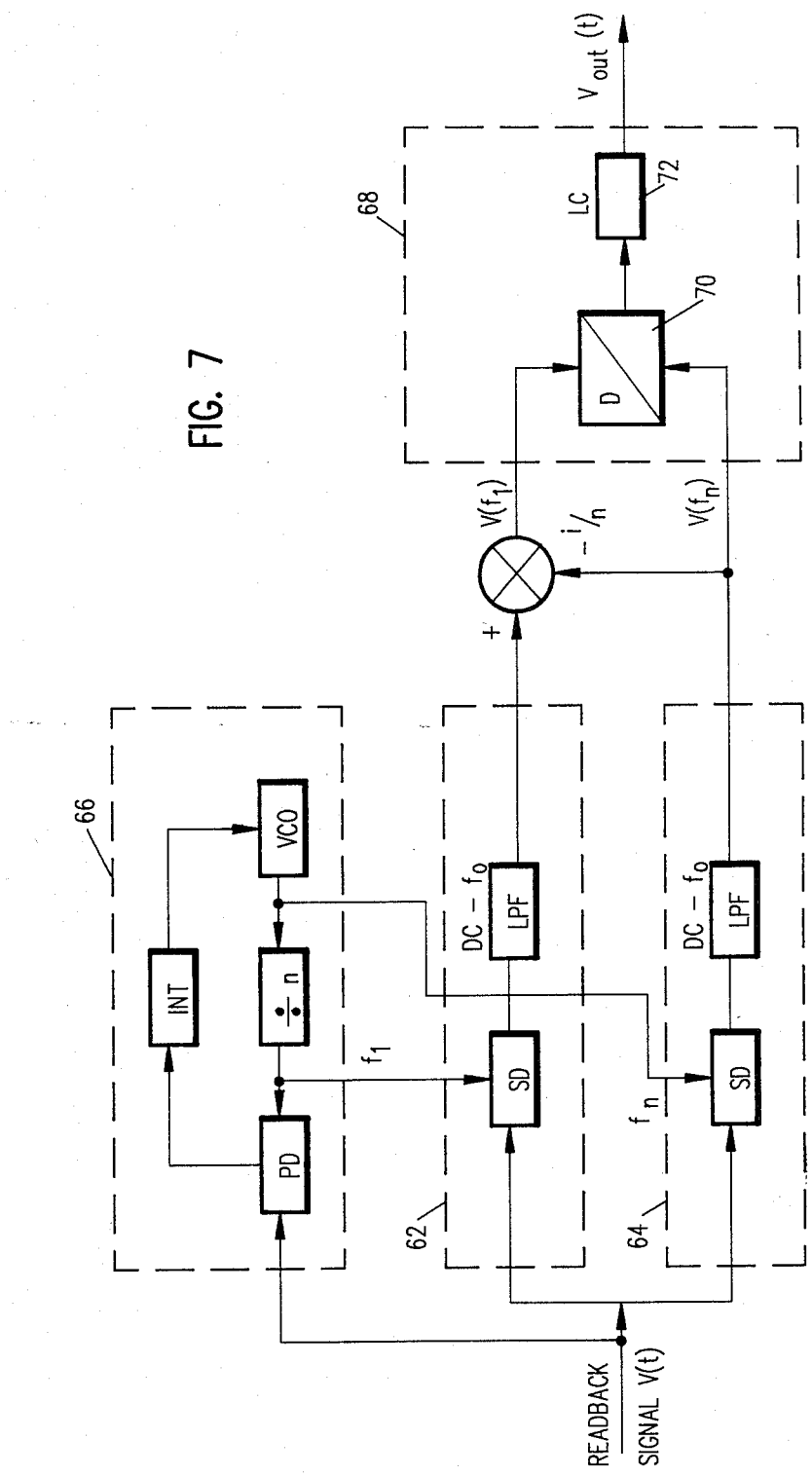
FIG. 7 is a block diagram of the apparatus for carrying out a further embodiment of the flying height measurement.

A specific embodiment of the apparatus used to perform the HRF method using phase-sensitive detection of two harmonics of the readback spectrum is shown in FIG. 7. The invention is not limited to phase-sensitive detection, however. The input signal $V(t)$ is the analog readback signal from the read preamplifier output. The harmonic line amplitudes $V(f_1)$ and $V(f_n)$ at frequencies $f_1$ and $f_n$ are detected by means of two coherent (or synchronous) detectors 62 and 64. These detectors will detect only the component of the respective spectral line amplitude that is in phase with the fundamental harmonic frequency $f_1$ of $V(t)$ and this is accomplished by the input of the readback signal $V(t)$ to phase-locked loop 66. The clocking outputs of phase locked loop 66 at frequencies $f_1$ and $f_n$ are coupled to the coherent detectors 62 and 64 to produce output signals equal to the instantaneous magnitude of the two selected spectral lines in the frequency spectrum. A log-ratio circuit 68 which includes a divider 70 and a logarithmic compressor 72 functions to determine the logarithm of the instantaneous amplitude of the pair of spectral lines. In the preferred embodiment only the first and third harmonic lines of the frequency spectrum are used since these are the harmonic lines with the highest signal-to-noise ratio. Also, when a switching type modulator (SD in 62 and 64) is used in the coherent detectors 62 and 64, ⅓ of the output of detector 64 may be subtracted from the output of detector 62 to arrive at $V(f_1)$. In this way the harmonic sensitivity of the switching modulator SD can be compensated.

The invention is not limited to this first and third harmonic ratio. By the use of the invention, all independent ratios between harmonics can be measured, and the resultant clearances can be averaged and weighted by the respective signal-to-noise ratios of the respective harmonic line amplitudes.

While the invention has been particularly shown and described with reference to a preferred embodiment thereof, it will be understood by those skilled in the art that various other changes in the form and details may be made therein without departing from the spirit and scope of the invention.

What is claimed is:

1. The method for measuring the flying height of a slider supporting a magnetic transducer is an operational moving magnetic storage system comprising the steps of:

producing relative motion between said magnetic transducer and a magnetic recording medium at a first velocity v so that the resulting air bearing positions a magnetic transducer slider at a first flying height from the recording medium;

writing a single signal of constant periodicity T over a predetermined area of said recording medium with said magnetic transducer;

sensing a readback signal at a wavelength W from said predetermined area of said recording medium with said magnetic transducer to produce a first signal;

continually lowering the flying height of said magnetic transducer slider;

continually sensing a readback signal from said predetermined area of said recording medium as said flying height is lowered;

determining the occurrence of contact of said magnetic transducer with said recording medium by sensing when the amplitude of said readback signal stabilizes;

sensing the amplitude of said readback signal at contact to produce a second signal; and calculating the absolute value of said first flying height as the ratio, expressed in decibels, of said first and second signals times wavelength W divided by a constant.

2. The method of claim 1 additionally comprising, during the step of lowering the flying height, of producing a repetitive motion of said magnetic transducer across said predetermined area of said recording medium so that the peak amplitude of said readback signal is sensed at said lowered flying height.

3. The method of claim 1 wherein said step of lowering the flying height of said magnetic transducer slider comprises lowering said first velocity v to a second velocity v2.

4. The method of claim 3 wherein said step of sensing a readback signal at said lowered flying height includes providing a tracking bandpass filter so that said signal sensing tracks said decreased velocity to said second velocity v2.

5. The method for measuring the flying height of a slider supporting a magnetic transducer in a moving magnetic storage system comprising the steps of:

producing relative motion between said magnetic transducer and a magnetic recording medium at a first velocity v so that the resulting air bearing positions a magnetic transducer slider at a first flying height from the recording medium;

writing a plurality of signals of constant periodicity $T_1, T_2—T_n$ over a predetermined area of the disk with said magnetic transducer, sensing a readback signal at a first wavelength $W_1 = v \times T_1$ from said predetermined area of said recording medium with said magnetic transducer to produce first signals;

sensing a readback signal at a second wavelength $W_2 = v \times T_2$ from said predetermined area of said recording medium with said magnetic transducer to produce a second signal;

lowering the flying height of said magnetic transducer slider to substantially zero;

sensing a readback signal at said lowered flying height from said predetermined area of said recording medium at said first and said second wavelengths to produce third and fourth signals; and calculating said first flying height as a constant times the product of two terms, the first of said two terms being the product of said two wavelengths divided by the difference between said two wavelengths, the second of two terms being the ratio of said first and second signals, expressed in decibels, subtracted from the ratio of said third and fourth signals, expressed in decibels.

6. The method of claim 5 additionally comprising, during the step of lowering the flying height, of producing a repetitive motion of said magnetic transducer across said predetermined area of said recording medium so that the peak amplitude of said readback signal is sensed at said lowered flying height.

7. The method of claim 5 wherein said step of lowering the flying height of said magnetic transducer slider comprises lowering said first velocity v to a second velocity v2.

8. The method of claim 7 wherein said step of sensing a readback signal at said lowered flying height includes providing a tracking bandpass filter so that said signal sensing tracks said decreased velocity to said second velocity v2.

9. The method for measuring the flying height of a slider supporting a magnetic transducer in a moving magnetic storage system comprising the steps of:
producing relative motion between said magnetic transducer and a magnetic recording medium at a first velocity v so that the resulting air bearing positions a magnetic transducer slider at a first flying height from the recording medium;
writing at least one signal of constant periodicity T over a predetermined area of the disk with said magnetic transducer, the readback signal resulting from reading said written signal having a spectral content comprising a plurality of different frequencies;
sensing a readback signal at a first wavelength $W_1 = vT$ from said predetermined area of said recording medium with said magnetic transducer to produce a first signal;
simultaneously sensing a readback signal at a second wavelength $W_n = nvT$ ($n \neq 1$, n is positive number) from said predetermined area of said recording medium with said magnetic transducer to produce a second signal;
lowering the flying height of said magnetic transducer slider to substantially zero;
sensing a readback signal at said lowered flying height from said predetermined area of said recording medium simultaneously at said first and said second wavelengths to produce third and fourth signals; and
calculating said first flying height as the product of two terms,
the first term being a constant times said first velocity v divided by the difference in frequency between said first and said second signals,
the second term being the difference of the ratio, expressed in decibels, of said first and said said second readback signals at said first and said second wavelengths and the ratio, expressed in decibels, of said third and fourth readback signals at said first and said second wavelengths.

10. The method of claim 9 wherein said second wavelength $W_n = nvT$ and wherein (n=2, 3 --- n).

11. The method of claim 9 wherein said second wavelength $W_n = nvT$ and wherein (n=3, 5, 7--- 2n-1).

12. The method of claim 9 wherein said first and said second wavelengths comprise two harmonic lines.

13. The method of claim 12 wherein said two harmonic lines comprise the 1st and 3rd harmonic lines.

14. The method of claim 9 wherein said step of calculating said first flying height comprises calculating a plurality of said ratios and combining said ratios weighted according to their signal-to-noise ratio.

15. The method of claim 9 additionally comprising the step of phase sensitively sensing the amplitude of the spectral lines at said first and said second wavelengths.

16. The method for measuring the flying height of a slider supporting a magnetic transducer in a moving magnetic storage system comprising the steps of:
producing relative motion between said magnetic transducer and a magnetic recording medium at a first velocity v so that the resulting air bearing positions a magnetic transducer slider at a first flying height from the recording medium;
writing a plurality of signals of constant periodicity $T_1, T_2 \cdots T_n$ over a predetermined area of the disk with said magnetic transducer,
sensing a readback signal at a first wavelength $W_1 = v \times T_1$ from said predetermined area of said recording medium with said magnetic transducer at said first flying height to produce a first signal;
simultaneously sensing a readback signal at a second wavelength $W_2 = v \times T_2$ from said predetermined area of said recording medium with said magnetic transducer to produce a second signal; and
calculating the change in flying height from said first flying height as a constant times the product of two terms, the first of said two terms being the product of said two wavelengths divided by the difference between said two wavelengths, the second of two terms being the ratio of said first and second signals, expressed in decibels, subtracted from the ratio of said third and fourth signals, expressed in decibels.

17. The method for measuring the flying height of a slider supporting a magnetic transducer in a moving magnetic storage system comprising the steps of:
producing relative motion between said magnetic transducer and a magnetic recording medium at a first velocity v so that the resulting air bearing positions a magnetic transducer slider at a first flying height from the recording medium;
writing at least one signal of constant periodicity T over a predetermined area of the disk with said magnetic transducer, the readback signal resulting from reading said written signal having a spectral content comprising a plurality of different frequencies;
sensing at a first time a readback signal at a first wavelength $W_1 = vT$ from said predetermined area of said recording medium with said magnetic transducer to produce a first signal;
simultaneously sensing a readback signal at a second wavelength $W_n = nvT$ (n=2, 3--- n) from said predetermined area of said recording medium with said magnetic transducer to produce a second signal;
sensing at a second time a readback signal at a first wavelength $W_1 = vT$ from said predetermined area of said recording medium with said magnetic transducer to produce a third signal;
simultaneously sensing a readback signal at a second wavelength $W_n = nvT$ (n=2, 3--- n) from said predetermined area of said recording medium with said magnetic transducer to produce a fourth signal; and calculating the change in flying height from said first to said second time as the product of two terms, the first term being a constant times said first velocity v divided by the difference in frequency between said first and said second signals, the second term being the difference of the ratio, expressed in decibels, of said first and said second readback signals at said first and said second wavelengths and the ratio, expressed in decibels, of said third and fourth readback signals at said first and said second wavelengths.

18. The apparatus for measuring the flying height of a slider supporting a magnetic transducer in an operational moving magnetic storage system comprising:

means for producing relative motion between said magnetic transducer and a magnetic recording medium at a first velocity v so that the resulting air bearing positions a magnetic transducer slider at a first flying height from the recording medium;

means for writing a single signal of constant periodicity T over a predetermined area of said recording medium with said magnetic transducer;

means for sensing a readback signal at a wavelength W from said predetermined area of said recording medium with said magnetic transducer to produce a first signal;

means for continually lowering the flying height of said magnetic transducer slider;

means for continually sensing a readback signal from said predetermined area of said recording medium as said flying height is lowered;

means for determining the occurrence of contact of said magnetic transducer with said recording medium by sensing when the amplitude of said readback signal stabilizes;

means for sensing the amplitude of said readback signal at contact to produce a second signal; and means for calculating the absolute value of said first flying height as the ratio, expressed in decibels, of said first and second signals times wavelength W divided by a constant.

19. The apparatus of claim 18 additionally comprising means for producing a repetitive motion of said magnetic transducer across said predetermined area of said recording medium so that the peak amplitude of said readback signal is sensed at said lowered flying height.

20. The apparatus of claim 18 wherein said means for lowering the flying height of said magnetic transducer slider comprises means for lowering said first velocity v to a second velocity v2.

21. The apparatus of claim 20 wherein said means for sensing a readback signal at said lowered flying height includes a tracking bandpass filter so that said signal sensing tracks said decreased velocity to said second velocity v2.

22. The apparatus for measuring the flying height of a slider supporting a magnetic transducer in a moving magnetic storage system comprising:

means for producing relative motion between said magnetic transducer and a magnetic recording medium at a first velocity v so that the resulting air bearing positions a magnetic transducer slider at a first flying height from the recording medium;

means for writing a plurality of signals of constant periodicity $T_1, T_2 \cdots T_n$ over a predetermined area of the disk with said magnetic transducer, means for sensing a readback signal at a first wavelength $W1 = v \times T_1$ from said predetermined area of said recording medium with said magnetic transducer to produce first signals;

means for sensing a readback signal at a second wavelength $W1 = v \times T_2$ from said predetermined area of said recording medium with said magnetic transducer to produce a second signal;

means for lowering the flying height of said magnetic transducer slider to substantially zero;

means for sensing a readback signal at said lowered flying height from said predetermined area of said recording medium at said first and said second wavelengths to produce third and fourth signals; and means for calculating said first flying height as a constant times the product of two terms, the first of said two terms being the product of said two wavelengths divided by the difference between said two wavelengths, the second of two terms being the ratio of said first and second signals, expressed in decibels, subtracted from the ratio of said third and fourth signals, expressed in decibels.

23. The apparatus of claim 22 additionally comprising means for producing a repetitive motion of said magnetic transducer across said predetermined area of said recording medium so that the peak amplitude of said readback signal is sensed at said lowered flying height.

24. The apparatus of claim 22 wherein said means for lowering the flying height of said magnetic transducer slider comprises means for lowering said first velocity v to a second velocity v2.

25. The apparatus of claim 24 wherein said means for sensing a readback signal at said lowered flying height includes a tracking bandpass filter so that said signal sensing tracks said decreased velocity to said second velocity v2.

26. The apparatus for measuring the flying height of a slider supporting a magnetic transducer in a moving magnetic storage system comprising the steps of:

means for producing relative motion between said magnetic transducer and a magnetic recording medium at a first velocity v so that the resulting air bearing positions a magnetic transducer slider at a first flying height from the recording medium;

means for writing at least one signal of constant periodicity T over a predetermined area of the disk with said magnetic transducer, the readback signal resulting from reading said written signal having a spectral content comprising a plurality of different frequencies;

means for sensing a readback signal at a first wavelength $W_1 = vT$ from said predetermined area of said recording medium with said magnetic transducer to produce a first signal;

means for simultaneously sensing a readback signal at a second wavelength $W_n = nvT$ ($n \neq 1$, n is positive number) from said predetermined area of said recording medium with said magnetic transducer to produce a second signal;

means for lowering the flying height of said magnetic transducer slider to substantially zero;

means for sensing a readback signal at said lowered flying height from said predetermined area of said recording medium simultaneously at said first and said second wavelengths to produce third and fourth signals; and means for calculating said first flying height as the product of two terms, the first term being a constant times said first velocity v divided by the difference in frequency between said first and said second signals, the second term being the difference of the ratio, expressed in decibels, of said first and said second readback signals at said first and said second wavelengths and the ratio, expressed in decibels, of said third and fourth readback signals at said first and said second wavelengths.

27. The apparatus of claim 26 wherein said second wavelength $W_n = nvT$ and wherein ($n = 2, 3 \text{---} n$).

28. The apparatus of claim 26 wherein said second wavelength $W_n = nvT$ and wherein ($n = 3, 5, 7 \text{---} 2n - 1$).

29. The apparatus of claim 26 wherein said first and said second wavelengths comprise two harmonic lines.

30. The apparatus of claim 29 wherein said two harmonic lines comprise the 1st and 3rd harmonic lines.

31. The apparatus of claim 26 wherein said means for calculating said first flying height comprises means for calculating a plurality of said ratios and means for combining said ratios weighted according to their signal-to-noise ratio.

32. The apparatus of claim 26 additionally comprising means for phase sensitively sensing the amplitude of the spectral lines at said first and said second wavelengths.

33. The apparatus for measuring the flying height of a slider supporting a magnetic transducer in a moving magnetic storage system comprising:

means for producing relative motion between said magnetic transducer and a magnetic recording medium at a first velocity v so that the resulting air bearing positions a magnetic transducer slider at a first flying height from the recording medium;

means for writing a plurality of signals of constant periodicity $T_1, T_2 \text{---} T_n$ over a predetermined area of the disk with said magnetic transducer, means for sensing a readback signal at a first wavelength $W1 = vxT_1$ from said predetermined area of said recording medium with said magnetic transducer at said first flying height to produce a first signal;

means for sensing a readback signal at a second wavelength $W2 = vxT_2$ from said predetermined area of said recording medium with said magnetic transducer to produce a second signal; and means for calculating the change in flying height from said first flying height as a constant times the product of two terms, the first of said two terms being the product of said two wavelengths divided by the difference between said two wavelengths, the second of two terms being the ratio of said first and second signals, expressed in decibels, subtracted from the ratio of said third and fourth signals, expressed in decibels.

34. The apparatus for measuring the flying height of a slider supporting a magnetic transducer in a moving magnetic storage system comprising:

means for producing relative motion between said magnetic transducer and a magnetic recording medium at a first velocity v so that the resulting air bearing positions a magnetic transducer slider at a first flying height from the recording medium;

means for writing at least one signal of constant periodicity T over a predetermined area of the disk with said magnetic transducer, the readback signal resulting from reading said written signal having a spectral content comprising a plurality of different frequencies;

means for sensing at a first time a readback signal at a first wavelength $W_1 = vT$ from said predetermined area of said recording medium with said magnetic transducer to produce a first signal;

means for simultaneously sensing a readback signal at a second wavelength $W_n = nvT$ ($n = 2, 3 \text{---} n$) from said predetermined area of said recording medium with said magnetic transducer to produce a second signal; and means for sensing at a second time a readback signal at a first wavelength $W_1 = vT$ from said predetermined area of said recording medium with said magnetic transducer to produce a third signal;

means for simultaneously sensing a readback signal at a second wavelength $W_n = nvT$ ($n = 2, 3 \text{---} n$) from said predetermined area of said recording medium with said magnetic transducer to produce a fourth signal; and means for calculating the change in said flying height from said first to said second time as the product of two terms, the first term being a constant times said first velocity v divided by the difference in frequency between said first and said second signals, the second term being the difference of the ratio, expressed in decibels, of said first and said second readback signals at said first and said second wavelengths and the ratio, expressed in decibels, of said third and fourth readback signals at said first and said second wavelengths.

* * * * *

UNITED STATES PATENT AND TRADEMARK OFFICE
CERTIFICATE OF CORRECTION

PATENT NO. : 4,777,544

DATED : Oct. 11, 1988

INVENTOR(S) : B. R. BROWN, ET AL

It is certified that error appears in the above-identified patent and that said Letters Patent is hereby corrected as shown below:

Column 1, line 53, delete "Boudet", insert --Gaudet--.

Column 5, line 25, delete "1/2", insert --$\lambda$--.

Column 5, line 35, delete "Vo/V", insert --vo/v--.

Signed and Sealed this

Eleventh Day of April, 1989

Attest:

DONALD J. QUIGG

*Attesting Officer*  *Commissioner of Patents and Trademarks*